Nov. 18, 1969     L. L. BOTT     3,479,274
ELECTROCHEMICAL CELL HAVING CERAMIC-LINED TUBULAR CATHODES
Filed March 27, 1967     3 Sheets-Sheet 1

Inventor
Lawrence L. Bott
By Marzall, Johnston, Cook & Root
Attorneys

Nov. 18, 1969     L. L. BOTT     3,479,274
ELECTROCHEMICAL CELL HAVING CERAMIC-LINED TUBULAR CATHODES
Filed March 27, 1967     3 Sheets-Sheet 2

Inventor
Lawrence L. Bott
By Marzall, Johnston, Cook & Root
Attorneys

Nov. 18, 1969  L. L. BOTT  3,479,274
ELECTROCHEMICAL CELL HAVING CERAMIC-LINED TUBULAR CATHODES
Filed March 27, 1967  3 Sheets-Sheet 3

Inventor
Lawrence L. Bott
By Marzall, Johnston, Cook & Root
Attorneys

United States Patent Office

3,479,274
Patented Nov. 18, 1969

3,479,274
ELECTROCHEMICAL CELL HAVING CERAMIC-LINED TUBULAR CATHODES
Lawrence L. Bott, Oak Park, Ill., assignor to Nalco Chemical Company, Chicago, Ill., a corporation of Delaware
Filed Mar. 27, 1967, Ser. No. 625,992
Int. Cl. B01k 3/10; C22d 1/02
U.S. Cl. 204—260      5 Claims

ABSTRACT OF THE DISCLOSURE

An improved electrochemical cell wherein the anode is a particulate material which is contained in a hollow container which acts as a cathode and the anode is separated from the cathode by a porous, nonconductive ceramic material.

THE DISCLOSURE

The electrochemical cells referred to in the subject invention are those which utilize a sacrificial anode. More particularly, the cells referred to consist of at least one hollow chamber cathode and an anode which is made up of particulate material which is contained in the hollow space within the cathode. The anode is separated from the cathode by a liquid permeable, chemically inert, electrically nonconducting partition.

A specific application for which the electrochemical cells are employed is in the production of organo metallic compounds. Specifically, the cells are employed in the manufacture of tetraalkyl lead compounds, including, for example, tetraethyl lead, tetramethyl lead, triethylmonmethl lead, diethyldimethyl lead, monoethyltrimethyl lead, and mixtures thereof.

A typical electrochemical cell and a prior art liquid permeable, chemically inert, electrically nonconducting partition is described in U.S. 3,287,249. Typical partition materials, which have been used in the prior art in accordance with the practices described in the aforementioned patent, have been various fabrics supported by appropriate fastening mechanisms. The fabrics used have been largely those composed of polymeric materials, such as polyethylene, polypropylene, a polymer of tetrafluoroethylene (Teflon), a glass filament material, a copolymer material, such as nylon, or combinations of those materials. The fabrics have been woven so as to have openings sufficiently large to allow passage of liquid electrolyte but small enough to prevent passage of the particulate anode material.

Prior art materials have performed satisfactorily as a partition which allowed liquid electrolyte to flow between the anode and the cathode; however, all of these materials have a similar shortcoming in that they require some sort of a support structure to hold them in place. They also are extremely susceptible to wear which is due to strain from the weight of the particulate anode material, particularly when lead particles are used, and to abrasion which results from movement between the particulate anode material and the cathode. It would be of great benefit to the art if a suitable partition could be used which would require no further support structure than that of the cathode itself and which would be resistant to wear.

It therefore becomes an object of the subject invention to provide an electrochemical cell having a hollow cathode which is designed to hold a particulate sacrificial anode and which incorporates the improvement of a nonconducting partition between the cathode and the anode which is capable of withstandiing wear from abrasion and from the weight of the particulate material.

Another object of the invention is to provide a liquid permeable, chemically inert, electrically nonconducting partition on the inside of a hollow cathode which separates the cathode from a particulate anode contained within the hollow of the cathode and which is composed of a porous nonconductive ceramic material which is capable of remaining in place without the assistance of any special support mechanism.

A specific object of the invention is to provide an improved electrochemical cell having a plurality of tubular electrodes, each containing an anode and a cathode, the cell having a hollow main shell which houses the electrodes, hollow end closure members fastened to but electrically insulated from the main shell, means connecting the anodes of the tubular electrodes to a source of positive potential and means connecting the cathodes of the tubular electrodes to a negative potential, in which the improvement consists of a partition between the cathode and the anode which is characterized as being liquid permeable, chemically inert, electrically nonconducting and resistant to wear by abrasion and by strain from the weight of the particulate material.

Other objects and advantages of the invention will appear in the following description, in conjunction with the accompanying drawings in which:

FIG. 1a is an enlarged view of one of the electrodes taken from the electrochemical cell of FIG. 1.

Figure 1:
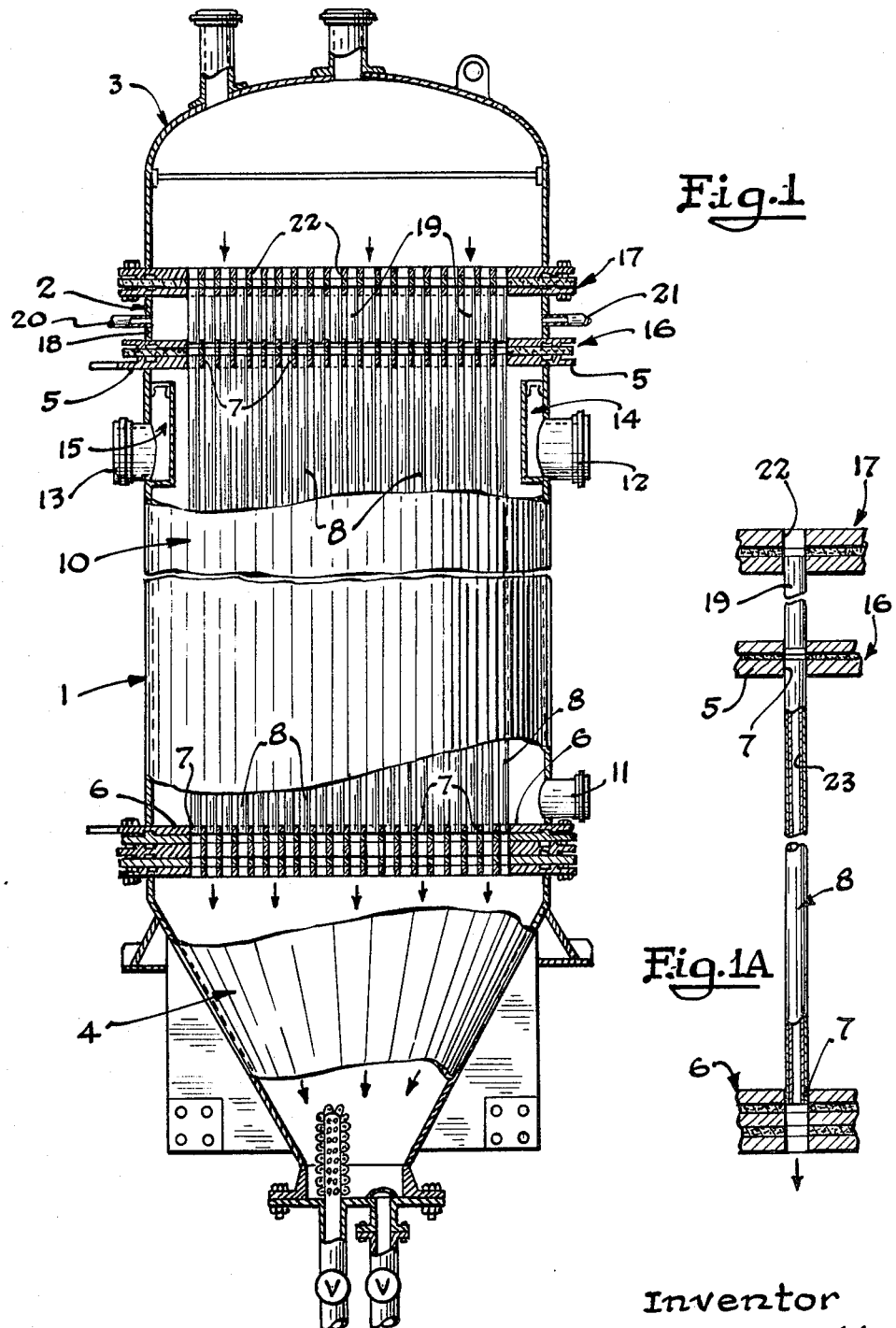
FIG. 1 is an elevational sectional view of a typical electrochemical cell with tubular electrodes which contain the liquid permeable, chemically inert, electrically nonconducting ceramic partition of the subject invention.

In general, the cell structure illustrated in the drawings comprises a hollow main shell having end plates at opposite ends with aligned apertures in the plates. The structure contains a plurality of individual tubular electrodes in the main shell, each having opposite ends disposed in and secured in the apertures in the plates. Each of the tubular electrodes comprises an anode and a cathode. The main shell contains hollow end closure members at its opposite ends and means electrically insulating the end closure members from the main shell.

The cell also contains means connecting the anodes of the tubular electrodes to a source of positive potential, through one of the end closure members, and means connecting the cathodes of the tubular electrodes to a source of negative potential, through the main shell. The tubular electrodes contain a porous nonconductive ceramic material which serves as a liquid permeable, chemically inert, electrically nonconducting partition between the cathode and the anode.

It is understood that the cell structure shown in FIG. 1 is merely illustrative of a typical embodiment of the invention. Any electrochemical cell which comprises at least one cathode and a particulate sacrificial anode, wherein the anode and the cathode are separated by a porous nonconductive ceramic material, is within the scope of the subject invention. For instance, each of the tubular electrodes, as shown in the illustrations, could serve as a cell of the subject invention.

In the drawings, the general cell structure shown in

FIG. 1 comprises a main shell 1, a second shell 2, a top end closure member 3, and a bottom end closure member 4. The main shell 1 is provided with an upper end plate 5 and a lower end plate 6.

Each of the end plates 5 and 6 is substantially circular in cross section and is provided with aligned openings or apertures 7. Metal tubes 8 are preferably constructed of steel and welded or otherwise secured in the apertures 7 of plates 5 and 6. The number of tubes will vary, of course, depending upon the size of the main shell and the desired capacity of the unit.

The main shell is welded or otherwise secured in liquid-tight relationship to the end plates 5 and 6. Likewise, the metal tubes 8 are welded or otherwise secured in liquid-tight relationship to the end plates so as to form a chamber 10 around the metal tubes 8. A heat exchange liquid can be introduced into the chamber 10 through an inlet opening 11 and removed or recirculated through outlets 12 and 13, which are provided with baffles 14 and 15, respectively.

The second shell 2 consists of two end plates 16 and 17 having apertures 22, corresponding to apertures 7 in end plates 5 and 6 of the main shell 1. A circular sheet metal housing 18 is welded or otherwise secured to end plates 16 and 17 of the second shell 2 to form a liquid-tight enclosure. Short tubes 19, preferably made of steel and corresponding in diameter to the tubes 8, are welded or otherwise secured in a liquid-tight engagement in apertures 22 of end plates 16 and 17 of second shell 2. Openings 20 and 21 are provided as inlet or outlet openings to introduce and remove heat exchange fluid, if desired, or for the purpose of draining condensate from the interior of the second shell 2.

Tubes 8 and 19 are provided with a porous nonconductive ceramic lining 23. This lining is better illustrated in FIG. 1a.

Figure 2:
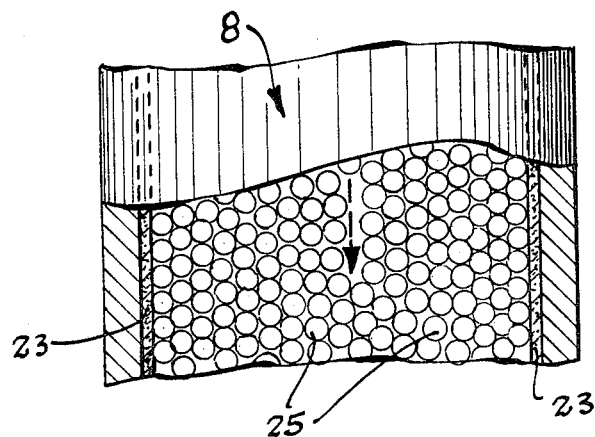
FIG. 2 is a cutaway view showing a section through a typical electrode from an electrochemical cell such as the one shown in FIG. 1.

FIG. 2 shows a cutaway view of a typical tube 8. FIG. 2 could also be considered to be a cutaway view of a simple electrochemical cell in which the tube 8 serves as a cathode. Sacrificial particulate anode material 25 is shown contained in tube 8. A porous nonconductive ceramic lining 23 is interposed between tube 8 and anode material 25.

Figure 3:
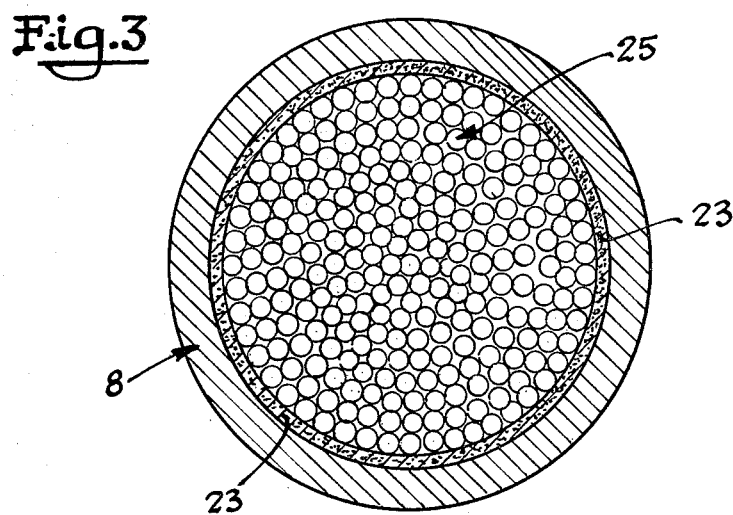
FIG. 3 is a cross-sectional view through the same electrode as shown in FIG. 2.

FIG. 3 is a cross-sectional view showing tube 8 and anode material 25, separated by a porous nonconductive ceramic material 23.

Figure 4:
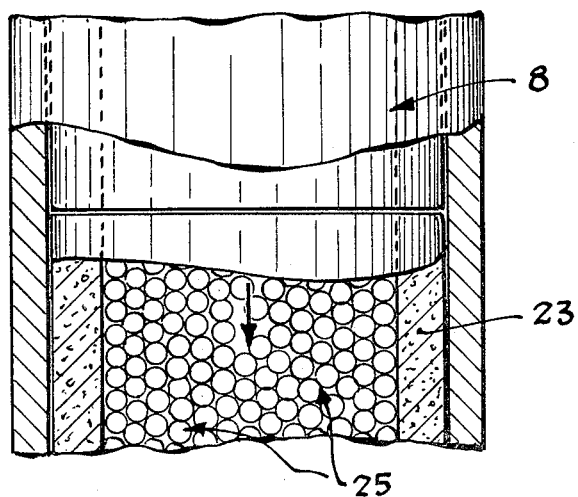
FIG. 4 is another cutaway view of a typical electrode which shows a variation on the partition shown in FIG. 2.

FIG. 4 is a cutaway view of a specific embodiment of the invention in which the ceramic material 23, which is interposed between the tubular cathode 8 and the particulate anode material 25, is a lining composed of preformed porous ceramic shapes which are so implaced as to form a continuous ceramic lining between metal tube 8 and particulate material 23.

Figure 5:
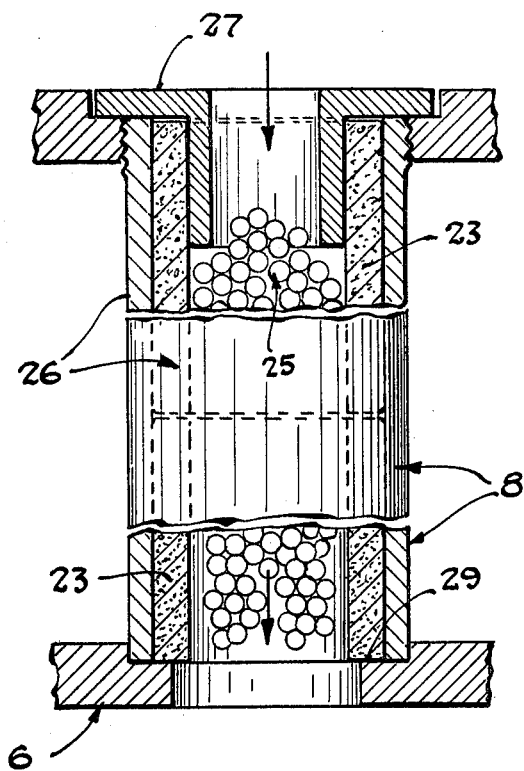
FIG. 5 is a cutaway view of a typical electrode showing an end fastener for use with one type of ceramic partition.

FIG. 5 is a sectional view showing a tube 26 with top flange 27, so implaced as to form a positive holding member for ceramic lining 23, in a particular embodiment in which the ceramic lining is composed of preformed shapes.

FIG. 5 further illustrates the specific embodiment in which the aperture in end plate 6 is so aligned to tube 8 as to form a shelf 29 which supports ceramic lining 23 in the embodiment of the invention, wherein the ceramic lining consists of preformed shapes.

The ceramic lining of the subject invention is characterized as being a porous, electrically nonconductive, liquid permeable and chemically inert ceramic material. The material may be applied to the inside of a hollow cathode, such as the one described in the foregoing figures, or it may simply be interposed between the cathode and the particulate anode material as a shelf-supporting screen.

When applied to the inside of the cathode directly, the ceramic material will be applied as a castable, a cement-like material which is capable of being poured or troweled into place, a thin coating or a stuccoed layer.

When the ceramic lining consists of a self-supporting ceramic barrier, it wil be made up of a series of preformed shapes, which are in the form of porous ceramic tiles, blocks or other shapes. The shapes can be put into position by themselves or with the aid of a suitable cementitious material to hold them together.

The term "castable," as used above and as it refers to the subject invention, is meant to include ceramic materials which are made up of a suitable ceramic aggregate and a hydraulic setting binder such as calcium silicate or calcium aluminate. The castables which are useful in the subject invention are further characterized as forming a porous body upon setting. Porosity can be achieved by entraining air in the wet castable, by selective grain sizing of the aggregate, by incorporating an organic material which can later be burned out to provide voids, or by other suitable means.

The cements which are useful in forming the ceramic lining of the subject invention are those which consist of a suitable ceramic aggregate and an organic or inorganic binder which is either air or heat setting. Suitable inorganic binders are colloidal silica, alkali metal silicates and the like. Suitable organic binders are the various phenolic resins, epoxys and other typical organic binders which are characterized as being chemically inert to electrolyte in the cell.

In a preferred embodiment of the invention the ceramic lining will be formed by use of a fluid ceramic coating slurry. The slurry may be applied by itself by pouring, dipping, brushing, spraying or other suitable means, or the slurry may be used in conjunction with a dry stucco material in build-up stuccoed layers.

The coating slurries which are useful in the subject invention should have a viscosity of less than 60 seconds as measured with a No. 5 Zahn cup. More preferably, the viscosity should be between 20 and 50 seconds as measured with a No. 5 Zahn cup, and most preferably, about 30 seconds.

A suitable stucco material is a ceramic aggregate which is characterized as being between 20 and 200 mesh as measured by the U.S. Standard Sieve Series. More preferably, the stucco material should be between 40 and 120 mesh and most preferably, between 50 and 100 mesh.

A typical stuccoed layer is built up by first coating the inside of a hollow cathode with an even layer of a ceramic slurry, such as the one described above. The slurry is then stuccoed by contacting it with an excess of a dry stucco material such as the one described above and pouring off any excess material which does not adhere to the coated surface. If additional stuccoed layers are desirable for reasons of strength, electrical resistivity or for any other reason, the original stuccoed layer is allowed to dry thoroughly and the slurry coating and stuccoing process is repeated.

The ceramic coated slurries which are useful in the subject invention are made up of a ceramic aggregate suspended in a liquid vehicle binder. Preferred binders for use in the slurries are those selected from the group consisting of aqueous alkali metal silicates, aqueous aluminum phosphates, colloidal silica, alumina coated colloidal silica sols, ethyl silicate, and various other soluble phosphates and silicates.

Preferred ceramic materials which are useful as the aggregate in the aforementioned slurries are those selected from the group consisting of alumina, crystalline silica, fused silica, various alumino-silicates, zircon, magnesia, and combinations thereof. In a preferred embodiment, it has been found to be particularly important to include at least some quantity of a mineral from the aforementioned group which is in fibrous or flake form. A very useful material which occurs naturally in fibrous form has been found to be asbestos. Other fibrous ceramic materials, either naturally occurring or synthetically produced, are also useful.

The most preferred binder for use in forming the slurries of the invention are colloidal silica sols. These are well-known materials and are commercially available from several sources of supply. A typical group of commercially available silica sols that may be used in the practice of the invention are those silica sols sold under the name "Nalcoag." Some silica sols of this type are described below in Table I.

suspending phase, it is desirable that the sols contain silica particles which are dense, amorphous, and have an average particle diameter which does not exceed 150 millimicrons. Preferably, the starting silica sols have an average particle size diameter of from 3–50 millimicrons. The silica concentration in the sols may be between 0.1% and 60% by weight silica expressed as $SiO_2$. More pre-

TABLE I

| Silica sol | I | II | III | IV | V | VI |
|---|---|---|---|---|---|---|
| Percent colloidal silica as $SiO_2$ | 15 | 30 | 35–36 | 21–22 | 49–59 | 35 |
| pH | 8.6 | 10.2 | 8.6 | 3.7 | 9.0 | 3.5 |
| Viscosity at 77° F. cps | 5 | 5 | 5 | 10 | 20–30 | 6.5 |
| Specific gravity at 68° F | 1.09 | 1.205 | 1.255 | 1.06 | 1.385 | 1.255 |
| Average surface area, m.² per gram of $SiO_2$ | 330–430 | 190–270 | 135–190 | 135–190 | 120–150 | 135–190 |
| Average particle size, millimicrons | 7–9 | 11–16 | 16–22 | 16–22 | 20–25 | 16–22 |
| Density, lbs./gallon at 68° F | 9.1 | 10.0 | 10.5 | 8.8 | 11.6 | 10.5 |
| $Na_2O$, percent | 0.04 | 0.40 | 0.10 | 0.05 | 0.30 | 0.01 |

Other silica sols that may be used, in addition to those mentioned above, may be prepared by using several well-known conventional techniques. The scope of the invention is not limited to the sols of Table I.

In a preferred embodiment of the invention, the silica sols are treated with a suitable base either at the time of manufacture, or just prior to use, to provide a pH of at least 10.0 and most preferably at least 10.5. These alkaline sols tend to promote adherence of the coating to the surfaces coated.

Perhaps, the most convenient method of making aqueous colloidal silica sols is described in Bird, U.S. Patent 2,244,325, wherein a dilute solution of an alkali metal silicate is passed in contact with a cation exchange resin in hydrogen form, whereby the silicate is converted to a dilute aqueous colloidal silica sol. The dilute sol may be concentrated to solids concentrations which are more economically usable from the standpoint of shipping costs and ultimate process use by employing the techniques described in either Bechtold et al., U.S. Patent 2,574,902; Broge et al., U.S. Patent 2,680,721; or Alexander et al., U.S. Patent 2,601,235. Another type of silica sol which may be used in the practice of the invention is described in the specification of Reuter, U.S. Patent 2,856,302.

While aqueous colloidal silica sols may be used, it will be understood that other forms of colloidal silica may be employed, such as, for instance, sols which contain a major portion of polar organic solvents. These sols may be generically referred to as organo sols, and are typified by the sols described in Marshall, U.S. Patent 2,386,247.

For a useful sol, it is only necessary that the silica particles used can be dispersed colloidally in a hydrophilic substance, such as water or lower alkyl alcohols and other organic compounds possessing relatively high dielectric constants. In some instances, mixtures of water and organic substances compatible with water may be employed as suspending media for the colloidal silica particles.

Particularly preferred organic substances for use in the sols are those which lower the freezing point of pure aqueous sols by admixture with the aqueous sols. Such final product sols are especially useful during the colder months of the year when they must be stored and/or used at relatively low temperatures.

Amines, such as morpholine, diethyl amine, etc., and polyhydroxy organics such as ethylene glycol, glycerine, etc., are preferred organic materials for use in making up silica sols. Sols may be made with these substances as a sole silica suspending media or as a portion of a mixture containing water and silica. A preferred sol, "winterized" against freezing, contains 5–50 parts by weight of a polyhydroxy compound, such as ethylene glycol, 20–85 parts by weight of water and 10–60 parts by weight of silica.

Regardless of the method employed tt produce the colloidal silica sol, which contains water, polar organic liquids or mixtures of these substances as a continuous ferred sols contain from 3.0 to 60% by weight of silica and most preferably, 10–60% by weight.

Other sols, which may be employed as binders for the silica refractory, are those known as "salt-free" silica sols. These sols are ptrticularly preferred when the suspension media of the silica particles in the binder itself is solely a polar organic liquid or a mixture of water and polar organic liquid.

Many of the above-described sols, which are not "salt-free," contain alkali metal compounds as stabilizers. These sols are generally not compatible with organic systems. Salts present in the aqueous sols cause gelation or precipitation of the silica particles when the aqueous phases are exchanged for polar organic solvents. These effects can be avoided by use of "salt-free" aqueous silica sols as starting materials in preparation of pure organo sols or in the use of mixtures of water and organic as silica carriers.

In order to obtain a "salt-free" sol, it is necessary that the cations be removed from the surface of the colloidally dispersed silica particles and from the liquid phase of the sol. This may be readily accomplished by treating typical silica sols of the type described in Bechtold et al., U.S. Patent 2,547,902, with a cation exchange resin in the hydrogen form and a strong base anion exchange resin is hydroxide form. This treatment tends to produce a finished aqueous sol in which both the continuous aqueous phase of the sol and the particles of silica are considered "salt-free." Typical commercially available silica sols which may be deionized to produce "salt-free" silica sols are those which are described in Table I above.

Aqueous "salt-free" silica sols may be used in combination with one or more of the named refractories to constitute a slurry coating material. They may also be modified whereby the aqueous phase is completely or partially exchanged for a hydrophilic polar liquid, such as an alcohol. The "salt-free" pure alcohol or aqueous-alcoholic silica sols may then be easily combined with a refractory to form a slurry which is useful in the subject invention.

When the particle sizes of the silica sols described above are within the ranges specified, the silica particles in the starting aqueous or organic sol have specific surface areas of at least 20 m.²/g., and usually in excess of 100 m.²/g. Further, when deionized sols are employed as a binder, they generally have a salt content, expressed as $Na_2SO_4$, of less than 0.01%.

The ceramic materials which are listed above as being useful as the aggregate in the slurry and in the stucco are all common materials which are available from a variety of sources. The particular ceramic aggregate for use in the subject invention is not critical, except that it must be electrically nonconductive.

In order that the ceramic coating be electrically nonconductive, the ceramic aggregate must be such that current leakage through a coating of from 1/32 to 1/2 inch thickness is a minimum. Preferably, the dielectric constant of the aggregate is at least 2.5; more preferably, at least 3.5 and, most preferably, above about 4.9.

The coating thickness must also be sufficient to retard excessive current leakage. The preferred thickness is greater than 1/32 inch. More preferably, the thickness of coating should be between 1/32 and 1/2 inch, and most preferably, between 1/16 inch and 3/8 inch.

In a greatly preferred embodiment of the subject invention wherein the ceramic coating is made up of stuccoed layers, it is particularly important that an amount of fibrous material be included in the aggregate which is mixed with the binder to form the slurry. The fibrous material aids in forming a smooth coating, which is free from flakes or cracks.

The fibrous or flake material may be any one of a number of materials which either occur naturally or are synthetically manufactured. In a greatly preferred embodiment of the invention, the fibrous material used is chrysotile asbestos. Glass flakes are used in another embodiment.

The fibrous material is mixed with the vehicle binder and ceramic aggregate which makes up the slurry prior to coating the surface of the cathode. When the fibrous or flake material is asbestos or glass flakes or fibers, the preferred amount to be added to the slurry is between 0.2–10.0% by weight; more preferably the amount of asbestos should be between 0.4–5.0% by weight of the total slurry, and most preferably, between 0.8–3.0% by weight.

The asbestos used in this greatly preferred embodiment of the invention is short fiber asbestos. It must be understood that in the case where other ceramic fibers are used in the slurry the scope of the invention is not limited to the weight percents noted above. Another ceramic fiber could be substituted for asbestos with the weight percent of the fiber in the total slurry being determined by the relative density and fiber length of the substituted fiber to the density and fiber length of the asbestos.

The asbestos used has a fiber length ranging anywhere from 1 micron to 1/2 inch after dispersion in the slurry. More preferably, the fiber length of the asbestos should be from 1 micron to 1/4 inch after the asbestos has been suspended in the slurry and most preferably, from 5–100 microns.

The invention will be more completely understood by referring to the following example:

EXAMPLE

Two electrolytic cells were coated according to the following procedure.

Four slurries were first prepared as follows:

(1) 40.5 lbs. of a 75% minus 325 mesh fused silica were mixed with 17.5 lbs. of a colloidal silica corresponding to silica sol No. II from Table I. The mixing was accomplished with a propeller mixer to form a uniform slurry. The viscosity was adjusted by the addition of fused silica powder until a No. 5 Zahn cup viscosity of 20 seconds was reached.

(2) A second slurry was made by adding 0.9% by weight, based on the total weight of the slurry, of short fiber asbestos to slurry No. 1.

(3) 35.0 lbs. of the same fused silica powder as used in the making of slurry No. 1 were mixed with 17.5 lbs. of the same colloidal silica as used in slurry No. 1. This slurry was mixed with a propeller mixer and the viscosity was adjusted to a No. 5 Zahn cup viscosity of 40 seconds.

(4) The fourth slurry was made by adding 0.9% by weight, based on the total weight of the slurry, of the same short fiber asbestos as was used in the making of slurry No. 2 to slurry No. 3.

Cell No. 1, which was tubular in shape, was coated by pouring slurries down the inside of the tube surface. This coating was accomplished by using combinations of the four slurries listed above, as is shown below in Table II. Stuccoing, where used, was done with a −50 mesh +100 mesh fused silica, which will hereinafter be referred to as S–1. The stuccoing was accomplished by pouring the S–1 stucco material down the inside of the tube surface. The coating was built up on the inside surface of cell No. 1 as shown below in Table II.

TABLE II.—CELL NO. 1

| | Slurry Coat | Stucco | Drying |
| --- | --- | --- | --- |
| 1st coat | 5 gallons of No. 1 slurry and approx. 1 gallon of No. 3 slurry. | S–1 | Forced air dried for 3½ hrs. |
| 2d coat | 5 gallons of No. 4 slurry and 1 gallon of No. 2 slurry. | None | Forced air dried for 10 hours. |
| 3d coat | 5 gallons of No. 4 slurry and 3 gallons of No. 2 slurry. | do | Forced air dried for 3½ hrs. |

Two additional slurries, Nos. 5 and 6, were made up for use in the coating of cell No. 2, as follows:

(5) 4 gallons of slurry No. 2 were mixed with one gallon of slurry No. 1 with a propeller mixer. Viscosity was adjusted to a No. 5 Zahn cup viscosity of 20 seconds by the addition of 2½ lbs. of the same colloidal silica sol as used in slurry No. 1 above. 25 grams of short fiber asbestos were then added to the slurry.

(6) 7 lbs. of the same fused silica powder as used in slurry No. 1 were added to 3 lbs. of the same colloidal silica sol as used in slurry No. 1. 45 grams of short fiber asbestos were added and the slurry was mixed with a propeller mixer. The viscosity of the slurry was adjusted to a No. 5 Zahn cup viscosity of 20 seconds by the addition of ½ lb. of colloidal silica sol.

Cell No. 2 was coated in a similar manner to cell No. 1, except that no stucco was used in building up the coating. The steps of coating cell No. 2 are shown below in Table III.

TABLE III.—CELL NO. 2

| | Slurry Coat | Stucco | Drying |
| --- | --- | --- | --- |
| 1st coating | 5 gallons of No. 5 slurry plus 1 gallon No. 6 slurry. | None | 2 hrs warm air blower. |
| 2d coating | do | do | Do. |
| 3d coating | do | do | Do. |

After the coating of the two cells was completed, the cells were tested by inserting lead particles into the interior of the cells in conjunction with a Grignard reagent, as an electrolyte. A potential was applied to the cell which rendered the lead articles anodic and the tubular cell cathodic. The cells were operated for a period of time with additional lead particles being added as necessary.

It was found that the ceramic coating held up much better than previously used barrier materials. The coating was also sufficiently porous and nonconductive as to serve equally as well as previously used nylon barriers, with respect to the electrochemical operation of the cell.

It can be readily seen by the foregoing example that the objectives of the invention, to provide an improved electrochemical cell which utilizes a ceramic material as a liquid permeable, chemically inert, electrically nonconductive partition between the cathode and the anode which is self-supporting and resistant to wear and abrasion, have been achieved. It has further been shown that a porous ceramic material has been discovered which serves extremely well as a liquid permeable, chemically inert, electrically nonconductive partition.

The invention is hereby claimed as follows:

1. In an electrochemical cell comprising
   (a) a hollow main shell having end plates at opposite ends, said plates having aligned apertures therein,
   (b) a multiplicity of hollow individual tubular electrodes able to contain a particulate material in the main shell, each having opposite ends disposed in the apertures, each having a space on the outside thereof within the main shell providing a zone for heat exchange and each having a liquid permeable, chemically inert, electrically nonconducting partition on the inside thereof,
   (c) upper and lower hollow end closure members at opposite ends of said main shell,
   (d) means electrically insulating the end closure members from the main shell,
   (e) means connecting the lower hollow end closure member to a source of positive potential whereby the particulate material is rendered anodic, and
   (f) means connecting the tubular electrodes to a source of negative potential through the main shell whereby the current passes through at least one of the end plates and renders the tubular electrodes cathodic;
the improvement which comprises a porous ceramic material as the liquid permeable, chemically inert, electrically nonconducting partition.

2. The improvement of claim 1 in which the porous ceramic material is bonded to the tubular electrode.

3. The improvement of claim 1 in which the porous ceramic material is a monolithic coating which is bonded to the tubular electrode.

4. The improvement of claim 3 in which the coating is derived from a mixture which comprises colloidal silica, a fibrous or flake material and a ceramic aggregate from the group consisting of silica, alumina, zirconia, magnesia and combinations thereof.

5. The improvement of claim 4 in which the fibrous material is asbestos and the ceramic aggregate is silica.

References Cited

UNITED STATES PATENTS

| 2,278,248 | 3/1942 | Darrah | 204—282 |
| 2,915,442 | 12/1959 | Lewis | 204—67 |
| 3,287,248 | 11/1966 | Braithwaite | 204—260 |
| 3,306,836 | 2/1967 | Ziegler et al. | |

HOWARD S. WILLIAMS, Primary Examiner

D. R. JORDAN, Assistant Examiner

U.S. Cl. X.R.

204—59, 263, 283, 295